Nov. 11, 1969  P. ORAZI  3,477,663
AIRCRAFT OR TOWED GLIDERS
Filed Dec. 6, 1966
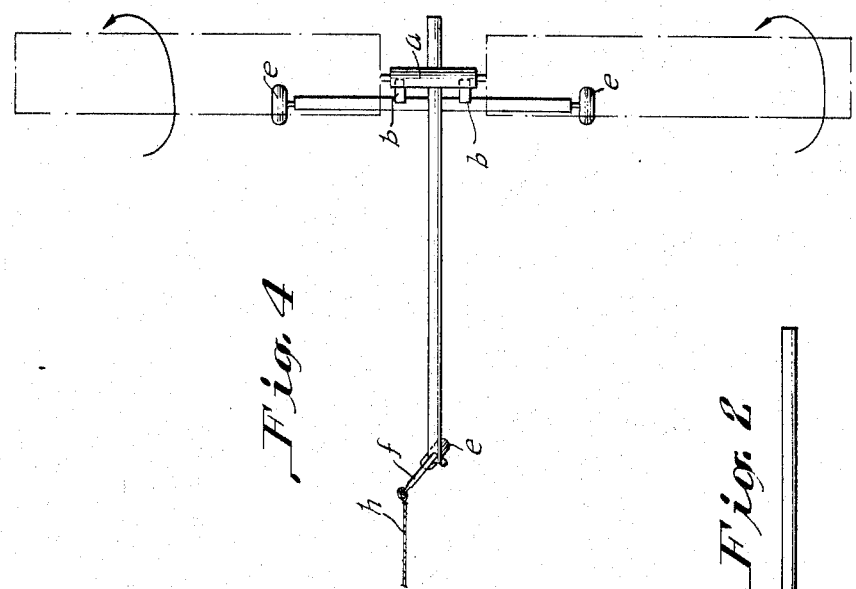
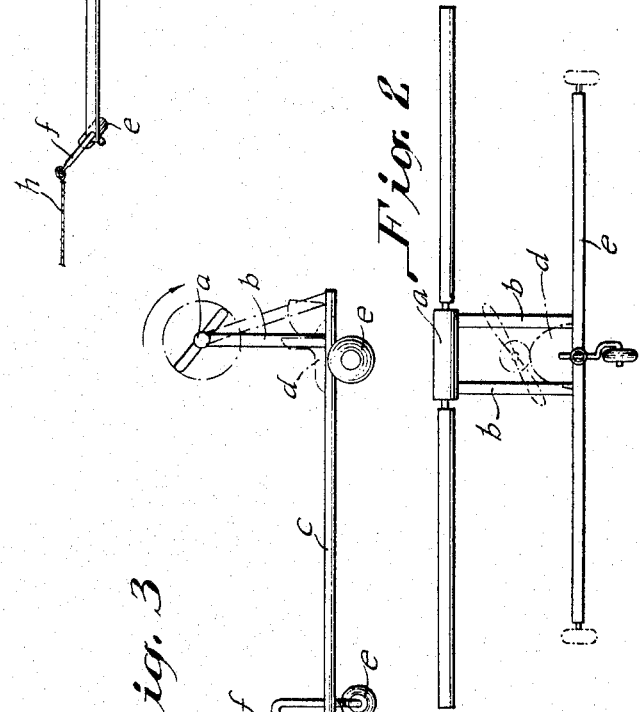
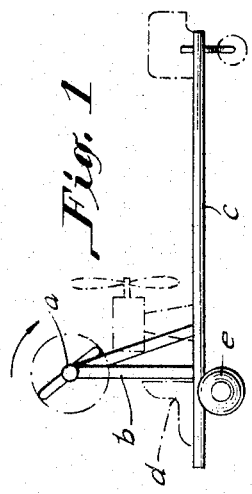
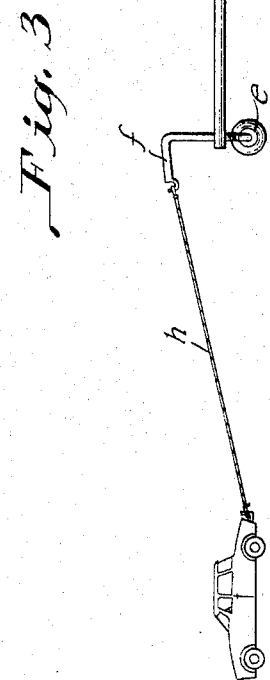
INVENTOR
Paola Orozi

United States Patent Office 3,477,663
Patented Nov. 11, 1969

3,477,663
AIRCRAFT OR TOWED GLIDERS
Paolo Orazi, Via S. Fiorano 1, Brescia, Italy
Filed Dec. 6, 1966, Ser. No. 599,479
Int. Cl. B64c 27/22, 27/00, 39/00
U.S. Cl. 244—8                                   2 Claims

ABSTRACT OF THE DISCLOSURE

Aircraft or towed glider of the spanwise rotary wing type, in which the wing is mounted on a special framework, at a fair distance from the body of the said aircraft.

---

This invention relates to aircraft or towed gliders.

According to this invention there is provided an aircraft or a towed glider including a body, and a wing disposed along an axis at right angles to the fore and aft axis of the body, and vertically fairly above the body in horizontal flight, the wing being rotatable about its axis.

Two examples of the present invention will now be described with reference to the accompanying drawings, of which:

FIG. 1 is a side elevation of an aircraft.
FIG. 2 is a front elevation of the aircraft shown in FIG. 1.
FIG. 3 is a side elevation of a glider towed by a car; and
FIG. 4 is a plan view of the glider shown in FIG. 3.

In the aircraft described here, the supporting structure $a$ of the wing rotating about spanwise axis, is mounted on a framework $b$ placed fairly higher in respect to the body $d$ and the landing $e$ (FIGS. 1, 2), in order that in flight the aircraft keeps lateral self stability.

Such a supporting structure is a portion of a tube, which has the aim to keep aligned the axis of the wing always along the axis of the tube said. The tube $a$ remains fixed to the structure $b$; the central element of the wing can rotate within the tube $a$.

FIGS. 3, 4 represent a towed glider, whereas the lateral stability is achieved in the same way. In FIG. 4 the leg $f$ of the front landing is automatically steered by the rope $h$ towed by the vehicle.

The present invention represents an improvement of my U.S. Patent 2,577,031 and others, which contemplate an aircraft flying with the wing rotating on its longitudinal axis. The said patents do not touch in fact the problem of how to build an aircraft which behaves in flight with lateral auto-stability.

The rotary wing on the longitudinal axis, described in said patents, is a wing which turns revolving on itself, describing a cylinder: it can't therefore assume other shapes with which it may be helped to achieve lateral stability, as the known V or dihedral, for which the aircraft, after a lateral fall caused by turbulence or loss of balance, recovers automatically its position of flight; but the wing rotating on the longitudinal axis, if by accident loses the position of flight, continues to rotate regularly as well, but it does no longer recover the flight said position.

Tests proved that, should a spanwise rotary wing aircraft be built with conventional fuselage, and, should the said wing be positioned even in the upper portion of the fuselage, such an aircraft could keep its lateral stability but for seconds.

Therefore, besides the spanwise rotary wing, it was necessary to develop a fuselage suitable for such a wing: to apply therefore the wing some yards (or anyhow, fairly above the aircraft body): the configuration here discussed of "vertical" frame, had never been achieved up till now in combination with the spanwise rotary wing: in fact the rotor of the helicopter or autogyro, rotates about the vertical axis, not the longitudinal axis, as the wing here described.

It is observed further (as it will be seen in the drawings) in FIG. 2, in front view, the sizable track of the landing, wide almost as the span; in fact, even having been solved the problem of the lateral auto stability, it was necessary to design a landing so wide, to protect the wing tips from crashing: the aircraft will be stabilized by the adopted design: but in case of lateral fall during the landing, a wing extremity might hit the ground, as explained, before the aircraft could recover the normal flight position: even the landing applied to this aircraft had to be, as seen, not of conventional design.

Even the scheme, or system, of a glider towed by a car, here described, had never been achieved before: it is pointed out that this is the only towed glider, which can carry a load without a pilot (not as the conventional autogyro-glider, or the conventional glider), and achieve take off, starting from the still position, flight and landing, without a pilot: in FIG. 3 of the drawings it is noted in fact the lack of vertical or horizontal empennage: the abolition of the vertical rudder is allowed by the configuration here contemplated, where the fuselage is prolonged forwardly: besides, the spanwise rotary wing is the only wing which in a towed glider requires neither empennage of any kind, nor pilot, (as instead the towed glider fixed wing, or the towed autogyro). (It is observed that the towed autogyro needs a pilot, a rudder, and a control of the rotor.)

But the said spanwise rotary wing requires only the scheme of a body and a landing, as contemplated in FIGS. 3, 4 of the included drawings.

What I claim is:

1. An aircraft or a towed glider including a body which extends along the fore and aft axis of the aircraft, a structure extending vertically upwardly from the aft end of the body and a pair of wings which are carried by the structure and project from the structure in opposite directions along an axis transverse to the fore and aft axis and vertically above it, the wings being rotatable about their axis, said wings comprising the sole control and lift surfaces for the aircraft or glider.

2. An aircraft according to claim 1, which comprises a tubular member which is carried by the structure and which receives the inboard ends of the wings for rotatably mounting said wings to said structure.

References Cited

UNITED STATES PATENTS

| 1,139,820 | 5/1915 | Smith | 244—9 |
| 1,766,472 | 6/1930 | Wander | 244—9 |
| 2,168,147 | 8/1939 | Arehart | 280—442 |
| 2,801,063 | 7/1957 | O'Gorman | 244—154 |

FOREIGN PATENTS 674,818  10/1929  France.

FERGUS S. MIDDLETON, Primary Examiner
T. W. BUCKMAN, Assistant Examiner

U.S. Cl. X.R.
244—19, 39, 154